US010995025B2

(12) United States Patent
Smith et al.

(10) Patent No.: US 10,995,025 B2
(45) Date of Patent: May 4, 2021

(54) LIQUID FLOW DISTRIBUTION SYSTEM

(71) Applicant: BioGill Environmental Pty Limited, Taren Point (AU)

(72) Inventors: Mark John Smith, Cronulla (AU); John David West, Werri Beach (AU); Jeremy Michael Wilson, Alexandria (AU); Christopher Jeffrey Locker, Hornsby (AU)

(73) Assignee: BIOGILL ENVIRONMENTAL PTY LIMITED, New South Wales (AU)

( * ) Notice: Subject to any disclaimer, the term of this patent is extended or adjusted under 35 U.S.C. 154(b) by 0 days.

(21) Appl. No.: 16/345,097

(22) PCT Filed: Oct. 10, 2017

(86) PCT No.: PCT/AU2017/000212
§ 371 (c)(1),
(2) Date: Apr. 25, 2019

(87) PCT Pub. No.: WO2018/076039
PCT Pub. Date: May 3, 2018

(65) Prior Publication Data
US 2019/0284069 A1    Sep. 19, 2019

(30) Foreign Application Priority Data

Oct. 28, 2016   (AU) .............................. 2016904390

(51) Int. Cl.
*C02F 3/04* (2006.01)
*C02F 3/10* (2006.01)
(Continued)

(52) U.S. Cl.
CPC ............ *C02F 3/043* (2013.01); *B05B 1/3436* (2013.01); *B05B 3/0486* (2013.01); *C02F 3/102* (2013.01); *C02F 2103/20* (2013.01)

(58) Field of Classification Search
CPC ...... C02F 3/043; C02F 3/102; C02F 2103/20; B05B 3/0486; B05B 15/50; B05B 1/3436
(Continued)

(56) References Cited

U.S. PATENT DOCUMENTS 2,236,943 A * 4/1941 Friend ..................... C02F 3/043
239/224
4,652,363 A * 3/1987 Miller ...................... B04C 5/02
209/734
(Continued)

FOREIGN PATENT DOCUMENTS

CN         104499232 A     4/2015
WO      WO-2015/161335 A1   10/2015

OTHER PUBLICATIONS

International Search Report dated Nov. 29, 2017 in International Application No. PCT/AU2017/000212, 4 pages.
(Continued)

*Primary Examiner* — Nam X Nguyen
*Assistant Examiner* — Julia L. Wun
(74) *Attorney, Agent, or Firm* — Foley & Lardner LLP (57) ABSTRACT

A liquid flow distribution system comprises a flow chamber and a rotor. The flow chamber has a flow chamber inlet, a flow chamber outlet and a chamber flow path extending from the flow chamber inlet to the flow chamber outlet. The flow chamber path is curved so as to generate a generally vortical flow in liquid passing through the chamber flow path. The rotor has a plurality of rotor blades rotatably mounted about a rotor axis. The rotor is mounted in proximity to the flow chamber outlet and positioned such that a flow of liquid exiting the flow chamber outlet impacts one or more of the rotor blades to rotationally drive the rotor. Rotational driving of the rotor in turn disperses liquid impacting the rotor blades.

13 Claims, 8 Drawing Sheets

(51) Int. Cl.
*B05B 1/34* (2006.01)
*B05B 3/04* (2006.01)
*C02F 103/20* (2006.01)

(58) Field of Classification Search
USPC ........................................ 210/150, 213, 215
See application file for complete search history.

(56) References Cited

U.S. PATENT DOCUMENTS

| | | | |
|---|---|---|---|
| 5,814,216 A | 9/1998 | Filion | |
| 6,881,340 B2 * | 4/2005 | Haley, III | C02F 3/043 210/143 |
| 7,897,048 B2 * | 3/2011 | Taylor | B01D 69/02 210/150 |
| 2009/0250394 A1 | 10/2009 | Taylor | |

OTHER PUBLICATIONS

Written Opinion of the International Searching Authority dated Nov. 29, 2017 in International Application No. PCT/AU2017/000212, 4 pages.

Extended European Search Report in corresponding European Application No. 17 86 5489.3 dated Jun. 3, 2020, 7 pages.

Office Action received in corresponding Chinese Application No. 2020073002181680 dated Aug. 4, 2020 (8 pages) and English Translation (8 pages).

* cited by examiner

LIQUID FLOW DISTRIBUTION SYSTEM

CROSS REFERENCE TO RELATED APPLICATIONS

The present application is a U.S. National Stage of International Application No. PCT/AU2017/000212 filed on Oct. 10, 2017, which claims the benefit of Australian Patent Application No. 2016904390 filed on Oct. 28, 2016, the entire disclosures of all of which are incorporated herein by reference.

FIELD

The present invention relates to a liquid flow distribution system. The liquid flow distribution system is particularly suitable for, but not limited to, use in water treatment units for treating waste water, aquaculture water and the like.

BACKGROUND

Figure 1:
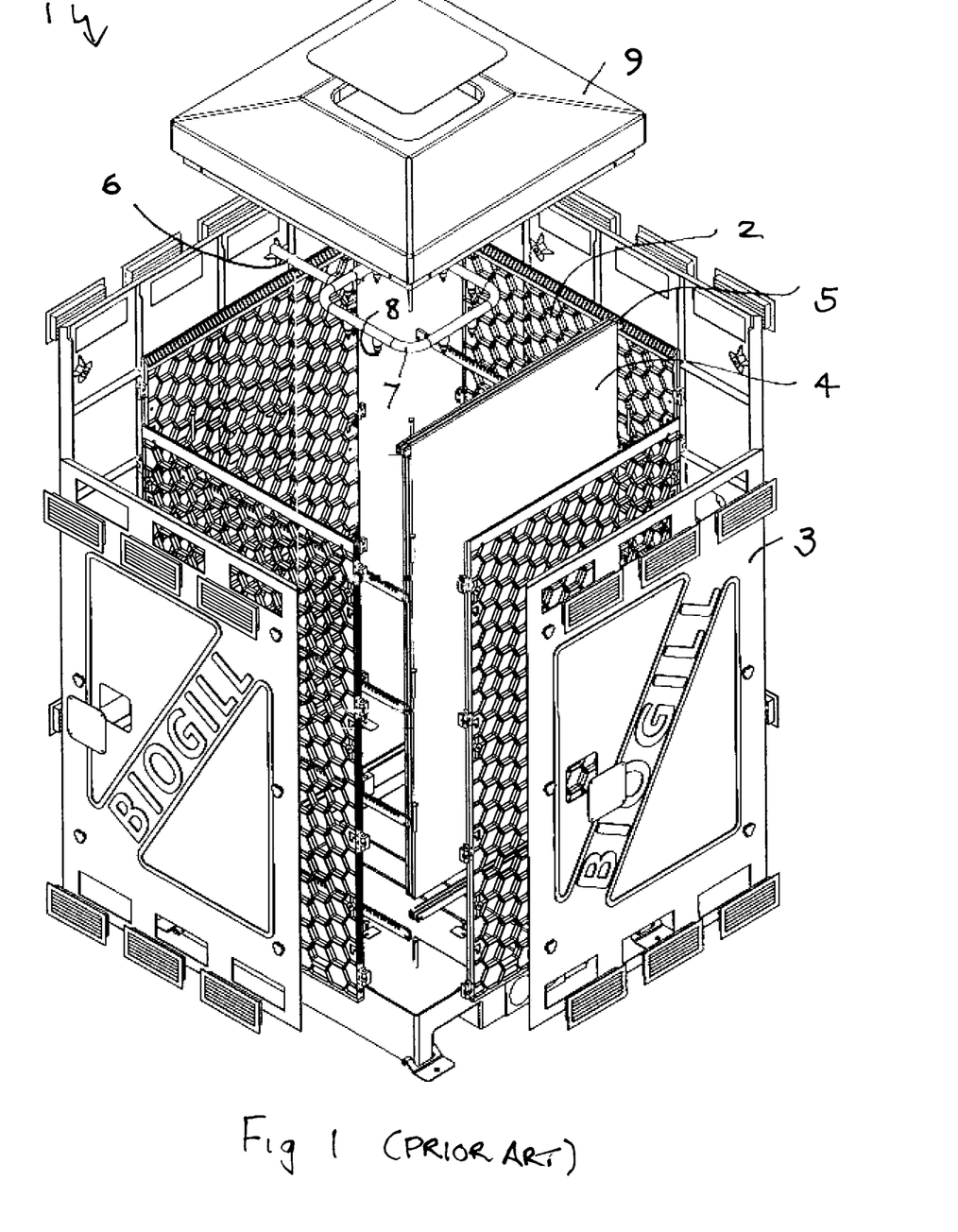
FIG. 1 is an exploded view of a water biotreatment unit according to the prior art.

Various forms of water treatment units are known for treating waste water and aquaculture water. One form of such water treatment units is bioreactors which utilise biomass cultures to absorb waste nutrients from the waste water or aquaculture water. An example of a membrane bioreactor form of water biotreatment unit is disclosed in International (PCT) Publication No. WO 2015/161335, the entire contents of which are hereby incorporated by cross reference. FIG. 1 depicts such a water biotreatment unit 1, in exploded form. Membrane bioreactors, such as the water biotreatment unit 1 of FIG. 1, utilise permeable membranes carrying a biomass culture that is exposed to the waste water and oxygen, which is required for the biomass culture to treat the waste water to remove waste nutrients from the same. The waste water being treated must be distributed across the membranes to allow the necessary interaction between the waste water and biomass culture.

The water biotreatment unit 1 specifically has a housing defined by four perforated inner walls 2 and four outer walls 3 which encase the inner walls 2 to define the exterior of the housing. A plurality of biotreatment membranes 4 are draped over and supported by hangers 5 that extend across the treatment cavity defined by the inner walls 2. For clarity, only three membranes 4 are depicted in FIG. 1, although a large number of membranes 4, typically forty to eighty, are provided and mounted closely side by side across the treatment cavity. Each of the biotreatment membranes 4 carries a biomass culture which removes waste nutrients from waste water passing vertically through the treatment cavity, in a manner described in WO 2015/161335. Waste water to be treated is distributed across the top of the membranes 4 by way of a water distribution system comprising an inlet pipe 6, tubular distribution ring 7 and an array of nozzles 8 spaced along the distribution ring 7 that disperse the waste water in the form of a spray across the top of the membranes 4. The water distribution system is mounted to the underside of a cover 9 of the housing. The spray nozzles 8, however, may be subject to clogging from biological growth of waste nutrients on interior surfaces of the narrow apertures of the nozzles, or otherwise be clogged by solids in suspension flowing in the waste water to be treated. Similarly, other known forms of water distribution system may also be subject to clogging by solids in suspension.

Liquid flow distribution systems as used in various other applications, where water or other liquids may be laden with solid materials in suspension, may also suffer from the same difficulties in clogging from the solid materials in suspension. An example of such an application is the distribution of liquid fertiliser, which has a high nutrient load, in agribusiness.

OBJECT OF INVENTION

It is an object of the present invention to substantially overcome or at least ameliorate the above disadvantage.

SUMMARY OF INVENTION

The present invention provides a liquid flow distribution system comprising:

a flow chamber having a flow chamber inlet, a flow chamber outlet and a chamber flow path extending from said flow chamber inlet to said flow chamber outlet, said chamber flow path being curved so as to generate a generally vortical flow in liquid passing through said chamber flow path;

a rotor having a plurality of rotor blades rotatably mounted about a rotor axis, said rotor being mounted in proximity to said flow chamber outlet and positioned such that a flow of liquid exiting said flow chamber outlet impacts one or more of said rotor blades to rotationally drive said rotor, rotational driving of said rotor in turn dispersing liquid impacting said rotor blades.

Typically, said chamber flow path comprises an upstream flow path portion and a downstream flow path portion, said flow chamber further comprising a generally cylindrical whirl chamber defining said downstream flow path portion, said flow chamber outlet being defined at a base of said whirl chamber.

In a preferred embodiment, said upstream flow path portion is configured to deliver liquid flow to said whirl chamber tangential to an outer wall of said whirl chamber.

In a preferred embodiment, the flow chamber has a curved flow division wall arranged in said upstream flow path portion to divide said upstream flow path portion into first and second flow branches.

Typically, said second flow branch extends at least partially about said first flow branch.

Preferably, in use, said second flow branch deflects liquid flowing through said second flow branch through at least 180 degrees.

In a preferred embodiment, said first and second flow branches are configured to deliver liquid flow to opposing sides of said whirl chamber.

In a preferred embodiment, said flow chamber outlet extends through a lower wall of said flow chamber.

In a preferred embodiment, said flow chamber outlet has a larger cross-sectional area than a cross-sectional area of said flow chamber inlet.

In a preferred embodiment, said plurality of rotor blades comprises at least two different configurations of rotor blade.

In a preferred embodiment, at least one of said rotor blades has a circumferentially extending blade fence at or adjacent a blade tip of said blade, said blade fence extending in a trailing direction.

In a preferred embodiment, said rotor further comprises at least one web extending between two adjacent rotor blades.

In a preferred embodiment, said rotor is rotatably mounted about a spindle, said spindle extending through said through flow chamber outlet and being mounted to said flow chamber.

In a preferred embodiment, said flow distribution system comprises:

a plurality of said flow chambers;

a plurality of said rotors, each said rotor being mounted in proximity to a corresponding said flow chamber; and a flow distribution manifold having a manifold inlet, a plurality of manifold outlets, and a branched manifold flow path extending from said manifold inlet to each of said manifold outlets, each said manifold outlet being in fluid communication with a flow chamber inlet of one of said flow chambers.

In a second aspect, the present invention provides a water biotreatment unit comprising:

a housing;

a plurality of biotreatment membranes disposed in said housing;

the liquid flow distribution system of the first aspect mounted to said housing above said plurality of biotreatment membranes.

BRIEF DESCRIPTION OF DRAWINGS

A preferred embodiment of the present invention will now be described, by way of an example only, with reference to the accompanying drawings wherein.

DESCRIPTION OF EMBODIMENTS

Figure 2:
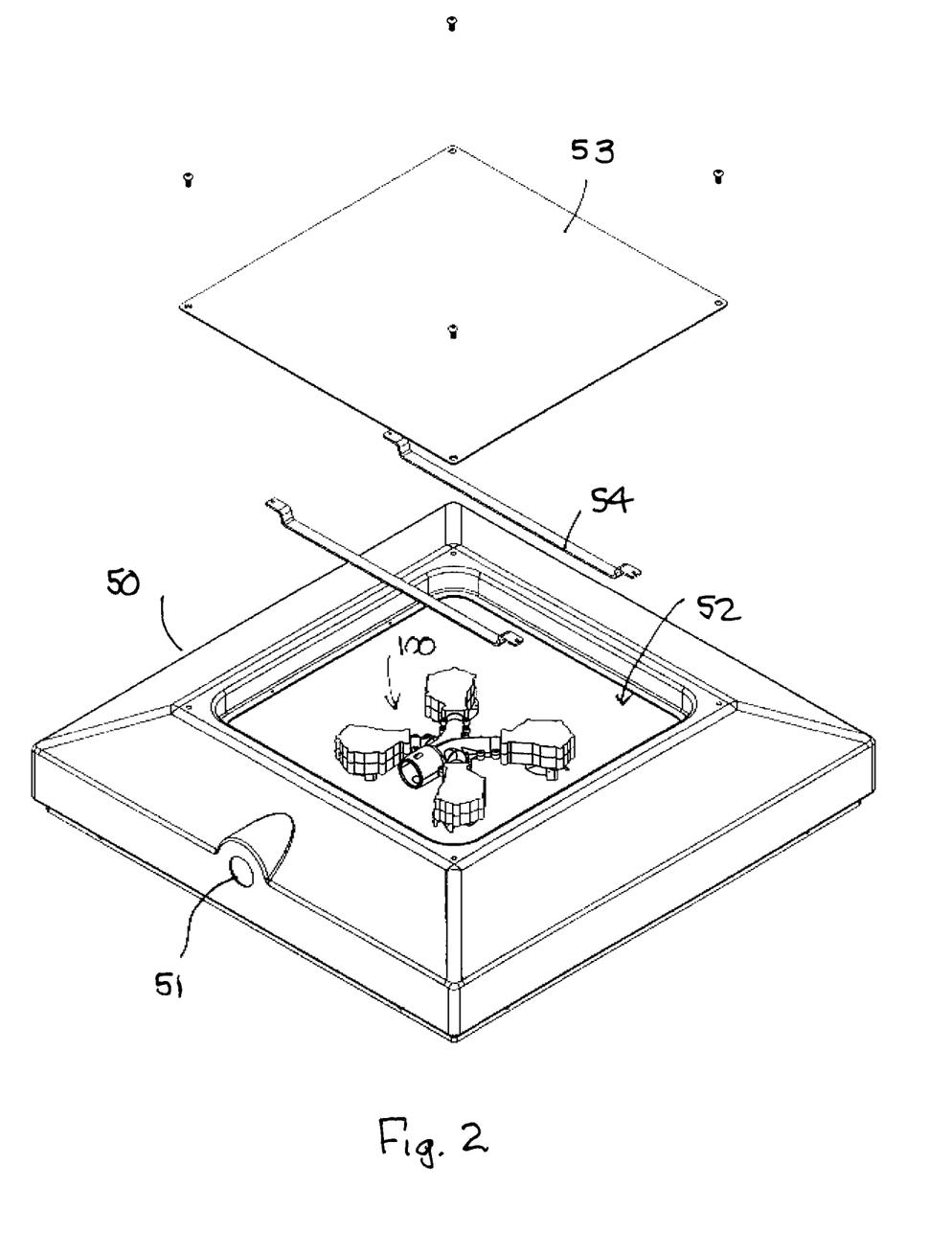
FIG. 2 is a perspective view of a liquid flow distribution system mounted in a cover of a water biotreatment unit.

FIG. 2 depicts a cover 50 for a water biotreatment unit suitable for use in place of the cover 9 of the water biotreatment unit 1 of FIG. 1. The cover 50 has a cover inlet 51 communicating with a cutout 52 formed in the top of the cover 50. A removable cap 53 is mounted over the cutout 52. A liquid flow distribution system 100 according to a preferred embodiment of the present invention is mounted in the cutout 52 of the cover 53 by way of a pair of mounting rails 54 that extend across the cutout 52 and are fixed to the body of the cover 50. The liquid flow distribution system 100 may be secured to the rails by any suitable means, including by screws, rivets or cable ties.

Figure 3:
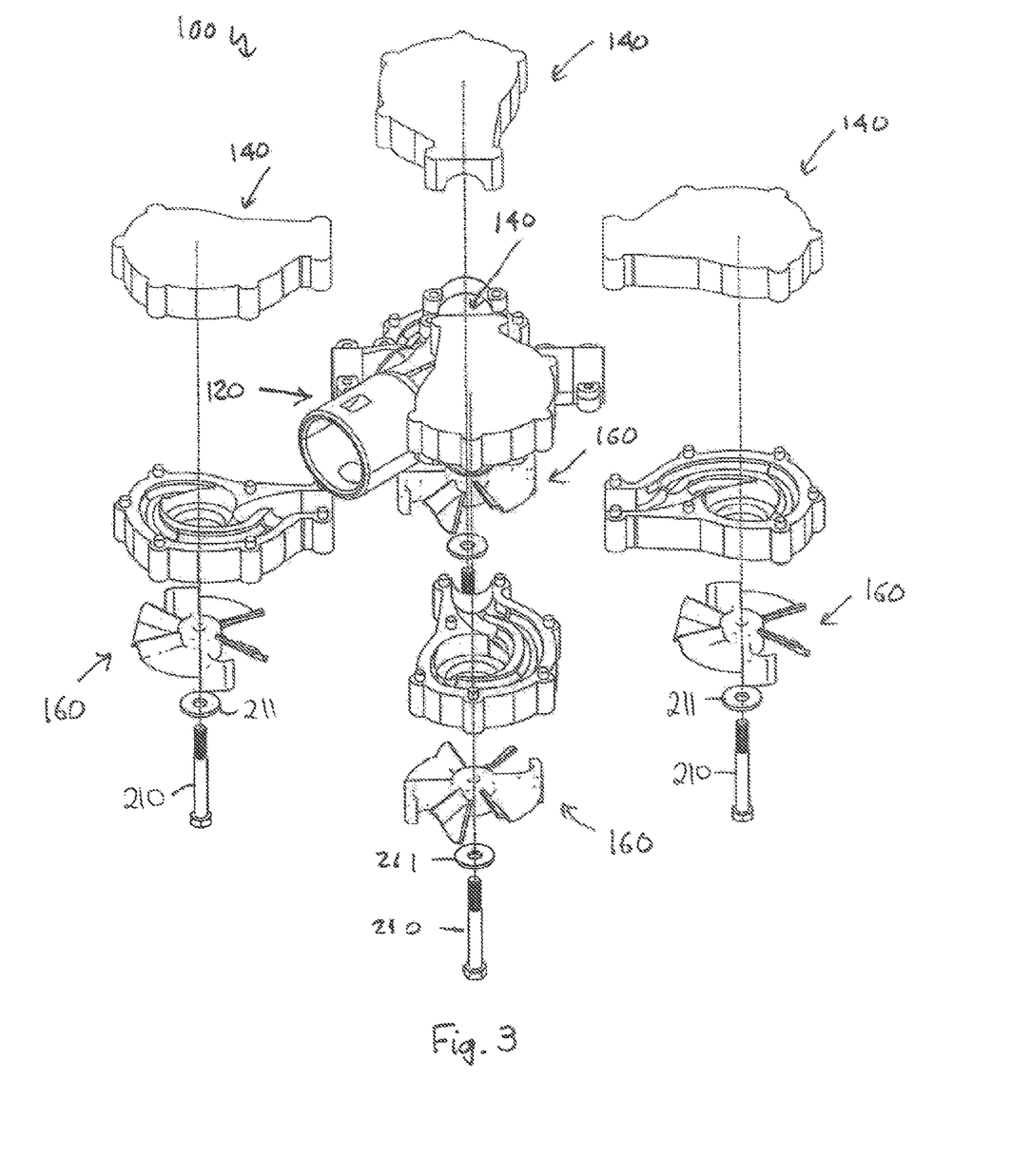
FIG. 3 is an exploded view of the liquid flow distribution system of FIG. 2.

The liquid flow distribution system 100 is depicted in greater detail in the exploded view of FIG. 3. In the arrangement of FIG. 3, the liquid flow distribution system 100 comprises a flow distribution manifold 120 and an arrangement of four flow chambers 140 in fluid communication with the flow distribution manifold 120. The liquid flow distribution system 100 further comprises an arrangement of four rotors 160, each mounted in proximity to an associated flow chamber 140.

Whilst the arrangement depicted utilises four flow chambers 140 and associated rotors 160 to distribute liquid flow across the top of the membranes of the treatment cavity of the water biotreatment unit, it is envisaged that a liquid flow distribution system may comprise a single flow chamber and associated rotor only, without a flow distribution manifold, where sufficient liquid flow distribution can be achieved to suit the specific application. Systems are also envisaged utilising a flow distribution manifold and two, three or more than four flow chambers and associated rotors.

Figure 4:
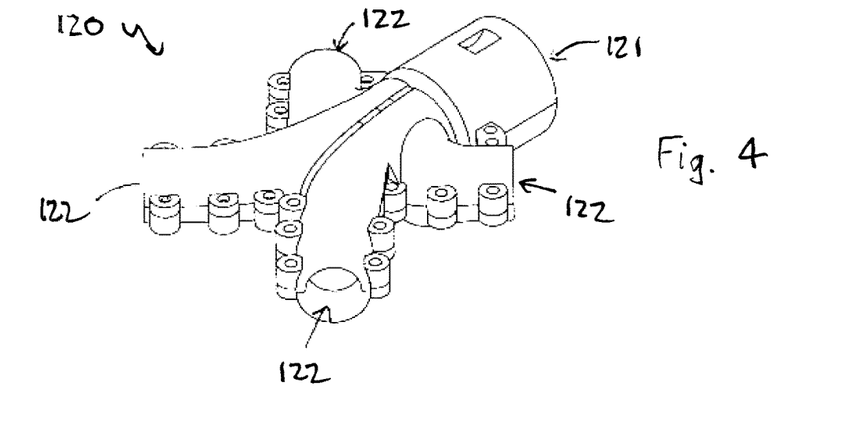
FIG. 4 is an isometric view of the flow manifold of the liquid flow distribution system of FIG. 1.
Figure 5:
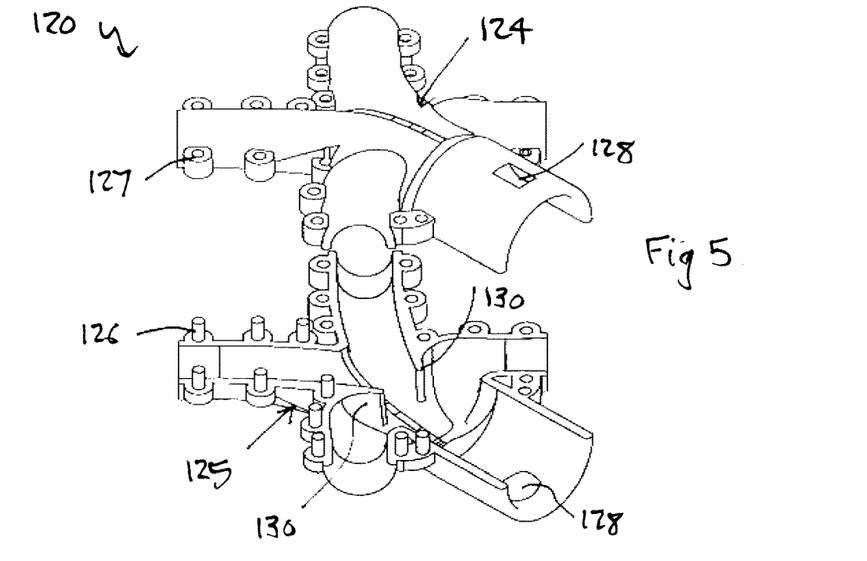
FIG. 5 is an exploded view of the flow manifold of FIG. 4.
Figure 6:
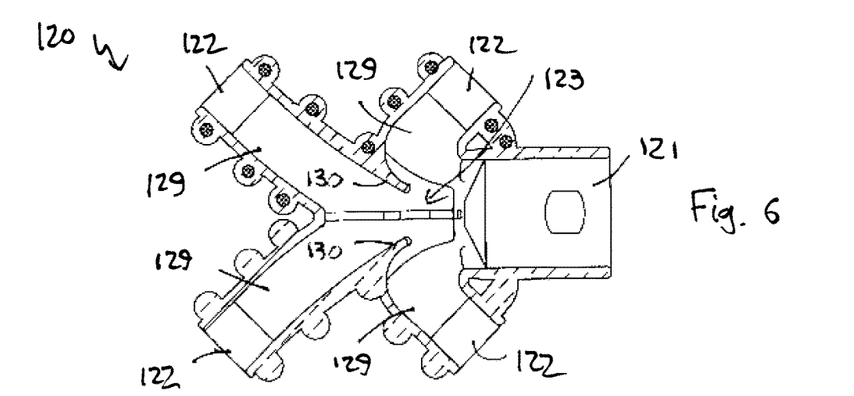
FIG. 6 is a sectional top plan view of the flow manifold of FIG. 4, taken at a central horizontal section.
Figure 7:
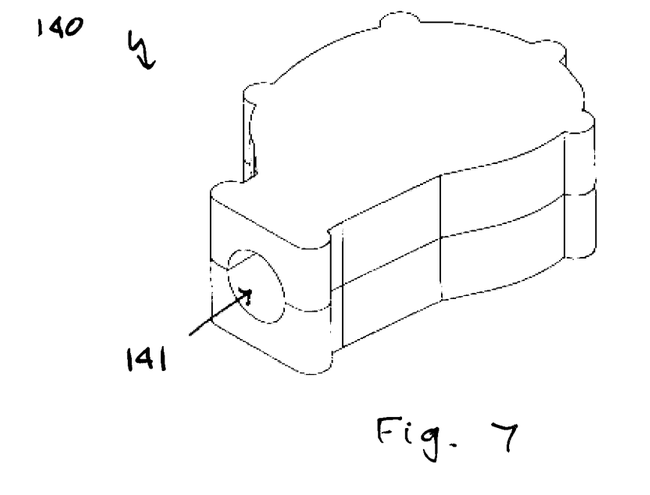
FIG. 7 is an isometric view of a flow chamber of the liquid flow distribution system of FIG. 1.

The flow distribution manifold 120 is depicted in greater detail in FIGS. 4 to 6. The flow distribution manifold 120 has a manifold inlet 121 and a plurality of manifold outlets 122, here comprising four manifold outlets 122 to correspond to the number of flow chambers 140. A branched manifold flow path 123 extends from the manifold inlet 121 to each of the manifold outlets 122, via four flow branches 129. As best shown in FIG. 5, the flow distribution manifold 120 is formed of upper and lower manifold segments 124, 125 that may conveniently each be injection moulded from plastics material and joined by an array of pins 126 and corresponding apertures 127 formed on the mating surfaces of the opposing upper and lower manifold segments 124, 125.

The manifold inlet 121 is of a generally cylindrical form and is provided with a pair of opposing deformable inwardly projecting projections 128 configured to provide a snap fit with the end fitting of a connection pipe (not depicted) that extends through the cover inlet 51 and communicates with a supply of waste water to be treated. Each manifold outlet 122 is also of a generally cylindrical form and is configured to couple to one of the flow chambers 140. In the depicted embodiment, the manifold inlet 121 has a diameter of approximately 52.2 mm and thus a cross-section of approximately 2140 $mm^2$, whilst each of the manifold outlets 122 has a smaller diameter of approximately 26.7 mm, and thus a smaller outlet cross-sectional area of approximately 560 $mm^2$.

The manifold flow path 123 is symmetric about a central vertical plane extending through the manifold inlet 121, with two manifold outlets 121 and associated flow branches 129 located on each side of the central vertical plane. The four flow branches 129 are equally angularly spaced, each being separated by 90 degrees and each being offset from the central vertical plane by 45 degrees. The flow branches 129, and particularly the walls 130 separating the inlets of each pair of flow branches 129 on the same side of the central plane, are configured to divide liquid flow through the flow distribution manifold 120 evenly between the flow branches 129, whilst minimising head losses. The manifold flow path 123 is free of constrictions that could result in clogging, with the minimum cross-sectional area of the manifold flow path 123 being approximately 560 $mm^2$, at each of the manifold outlets 122. Relatively large solid particles, having maximum dimensions of well over 5 mm, may thus pass freely through each flow manifold 120 without risk of blockage.

The manifold flow path 123 may be sized as appropriate to handle potentially larger solid particles if required.

Figure 8:
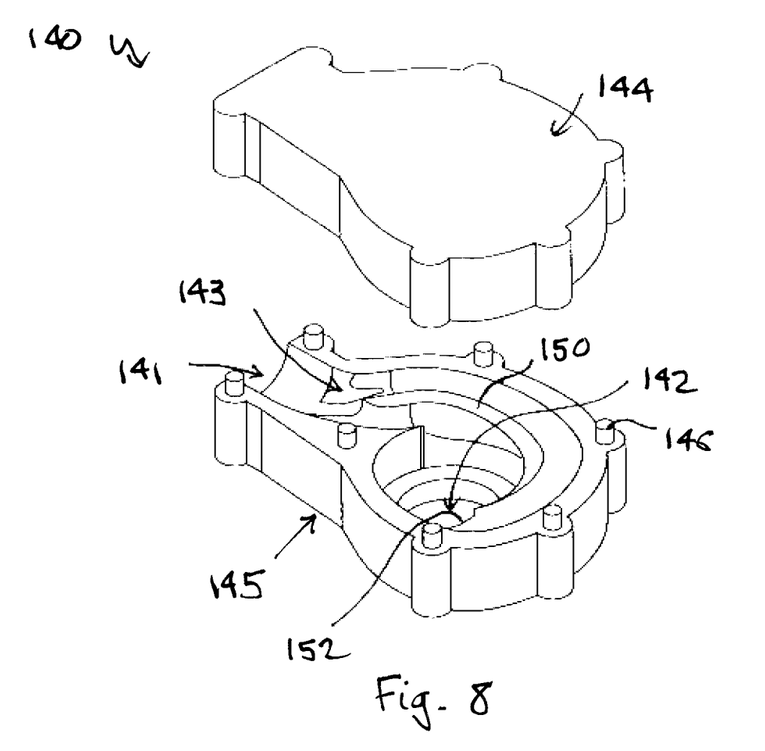
FIG. 8 is an exploded view of the flow chamber of FIG. 7.
Figure 9:
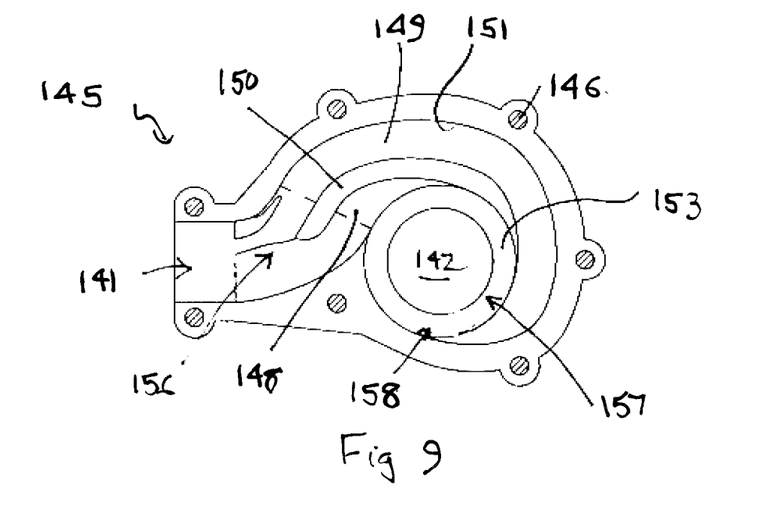
FIG. 9 is a sectional top plan view of the flow chamber of FIG. 7 taken at a central horizontal section.
Figure 10:
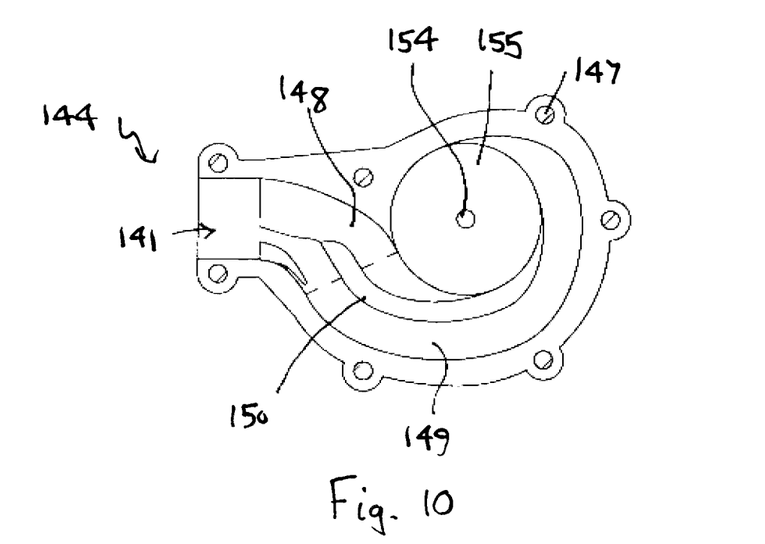
FIG. 10 is a sectional bottom plan view of the flow chamber of FIG. 7 taken at a central horizontal section.
Figure 11:
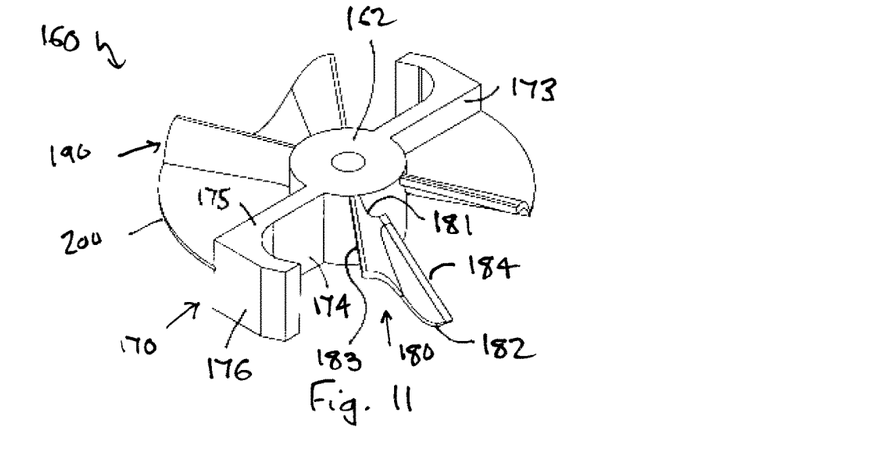
FIG. 11 is an isometric view of a rotor of the liquid flow distribution system of FIG. 2.
Figure 12:
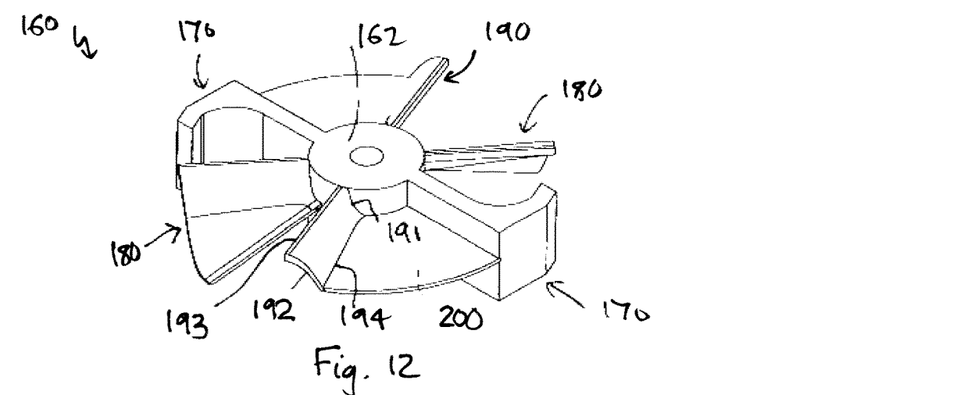
FIG. 12 is a further isometric view of the rotor of FIG. 11.
Figure 13:
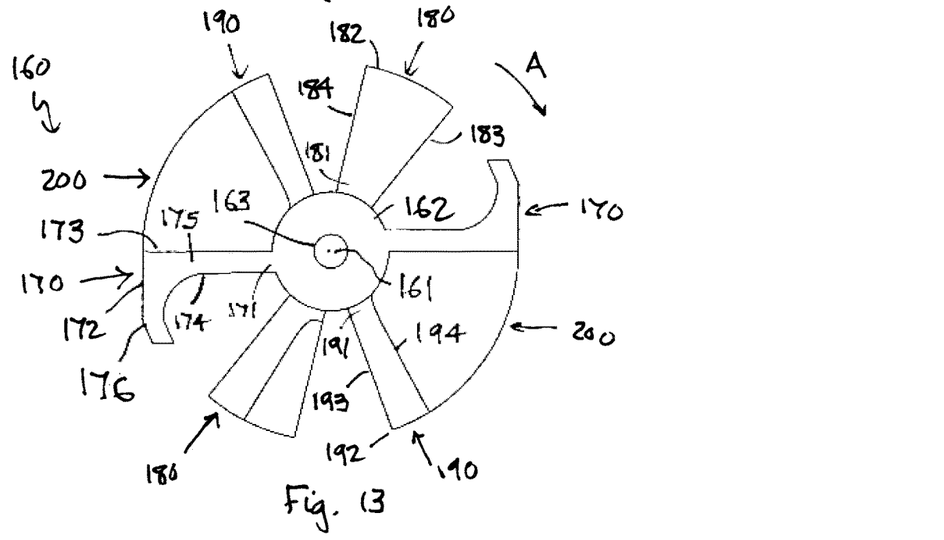
FIG. 13 is a plan view of the rotor of FIG. 11.

A flow chamber 140 is depicted in greater detail in FIGS. 7 to 10. Each flow chamber 140 has a flow chamber inlet 141, a flow chamber outlet 142 and a chamber flow path 143 extending from the flow chamber inlet 141 to the flow chamber outlet 142. The chamber flow path 143 is curved so as to deflect liquid passing from the flow chamber inlet 141 to the flow chamber outlet 142, generating a generally vortical flow in liquid as is passes through the chamber flow path 143. In the arrangement depicted, the chamber flow path 143 is configured to generate a vortical flow path extending in a clockwise rotational direction when viewed from above. As best shown in FIG. 8, the flow chamber 140 is formed of upper and lower flow chamber segments 144, 145 that may conveniently each be injection moulded from plastics material and joined by an array of pins 146 and corresponding apertures 147 formed on the mating surfaces of the opposing upper and lower flow chamber segments 144, 145.

The chamber flow path 143 has an upstream flow path portion 156, extending from the flow chamber inlet 141, and a downstream flow path portion 157, extending from the upstream flow path portion 156 to the flow chamber outlet 142. The flow chamber downstream portion 157 is defined by a generally cylindrical whirl chamber 158. The upstream flow path portion 156 is divided into first and second flow branches 148, 149 by a curved flow division wall 150 arranged in the flow path 143. The flow division wall 143 is arranged such that the second flow branch 149 extends at least partially about the first flow branch 148, with the second flow branch 149 extending along an outer wall 151 of the flow chamber 140. The second flow branch 149 is thus bounded on its radially inner side by the flow division wall 150 and on its radially outer side by the flow chamber outer wall 151. The second flow branch 149 deflects liquid flowing therethrough through at least 180 degrees such that, as liquid passes out of the end of the second flow branch 149 into the whirl chamber 158, the liquid flow is generally directed in a direction back toward the flow chamber inlet 141. The generally cylindrical form of the whirl chamber 158 is defined in part on one side by the curved flow division wall 150 and in part on the opposing side by the outer wall 151 of the flow chamber 140. The first and second flow branches 148, 149 accelerate the liquid flow delivered to the chamber flow path 143 through the flow chamber inlet 141 and separate the liquid flow into two streams. The first and second flow branches 148, 149 of the upstream flow path portion 156 deliver liquid flow into the whirl chamber 158 tangentially to the outer wall of the whirl chamber 158. Specifically, the first flow branch 148 delivers one stream of the liquid flow tangentially to the flow division wall 150 on one side of the whirl chamber 158 and the second flow branch 149 delivers the other stream of the liquid flow tangentially to the outer wall 151 of the flow chamber 140 on the opposing side of the whirl chamber 158. In the embodiment depicted, the first flow branch 148 has a diameter of approximately 12 mm, providing a cross-section area of approximately 113 mm2, and a length of approximately 25 mm. The second flow branch 149 also has a diameter of approximately 12 mm, with an extended length of approximately 125 mm.

In the arrangement depicted, the flow chamber inlet 141 is of a generally cylindrical form, extends generally horizontally through an end of the flow chamber 140 and is configured to couple to one of the manifold outlets 121, either directly or via an intervening connecting pipe (not shown). The flow chamber outlet 142 is also of generally cylindrical form, is defined at the base of the whirl chamber 158 and extends generally vertically through the lower wall 153 of the flow chamber 140. The flow chamber outlet 142 has a larger cross-sectional area than the cross-sectional area of the flow chamber inlet 141. In the specific embodiment depicted, the flow chamber outlet 142 has a diameter of approximately 35 mm, providing an outlet cross-sectional area of approximately 962 mm$^2$, whilst the flow chamber inlet 141 has a diameter of approximately 26.7 mm, providing an inlet cross-sectional area of approximately 560 mm$^2$ to match the manifold outlet 122. The flow chamber inlet 141 and manifold outlet 122 may thus be coupled with a short length of one inch (25.4 mm) pipe.

The chamber flow path 143 is free of constrictions that could result in clogging, with the minimum cross-sectional area of the chamber flow path 143 being approximately 113 mm$^2$ as defined by each of the first and second flow branches 148, 149. Relatively large solid particles, having maximum dimensions of over 5 mm, may thus pass freely through each flow chamber 140 without risk of blockage. The first and second flow branches 148, 149 may be sized as appropriate to handle potentially larger solid particles if required The flow chamber 140 further includes a threaded aperture 154 formed on the inside of the upper wall 155 of the flow chamber 140 for receiving a spindle 210 for attachment of an associated rotor 160, as will be further discussed below.

A rotor 160 is depicted in greater detail in FIGS. 11 to 16. Each rotor 160 comprises a plurality of rotor blades 170, 180, 190 rotatably mounted about a rotor axis 161. In the embodiment depicted, the rotor 160 has a rotor hub 162 with a vertically extending aperture 163 defining the rotor axis 161 and six rotor blades 170, 180, 190 integrally formed with the rotor hub 162. In the embodiment depicted, each rotor 160 is injection molded from plastics material and has a diameter of approximately 95 mm. Each rotor 160 is configured and mounted relative to the associated flow chamber 140 so as to rotate in the same rotational direction as the vertical flow of liquid discharged from the flow chamber outlet 142, being in a clockwise direction A as viewed from above. Accordingly, in the present specification, features of the first and second rotor blades 170, 180 will be described as leading/forward and trailing/rear based on the direction of rotation of the rotor 162 and the direction of rotation of the vortical flow.

In the arrangement depicted, the six rotor blades 170, 180, 190 comprise three different configurations of rotor blade, with a pair of opposing first rotor blades 170, a pair of opposing second rotor blades 180 each trailing an adjacent first rotor blade 170 and a pair of opposing third rotor blades 190 each trailing an adjacent second rotor blade 180 and leading an adjacent first rotor blade 170. The rotor blades 170, 180, 190 are equally angularly spaced about the rotor hub 162. Having at least two, and here three, different configurations of rotor blade assists in providing a broad dispersion of liquid, with each different configuration of rotor blade 170, 180, 190 deflecting the liquid in a different manner to provide a different flow distribution pattern. The rotor 160 further comprises a pair of opposing horizontally oriented webs 200 that each extend between adjacent first and third rotor blades 170, 190.

Each first rotor blade 170 radially extends from a first blade root 171 at the rotor hub 162 to a first blade tip 172 at the radially outer end of the first rotor blade 170. Each first rotor blade 170 comprises a vertically and radially extending arm 175 having planar upright leading and trailing arm faces 173, 174. Each first rotor blade 170 further comprises a vertically and circumferentially extending blade fence 176 located at or adjacent the first blade tip 172 and extending rearwardly from the arm trailing face 174, here in a counter clockwise direction.

Figure 14:
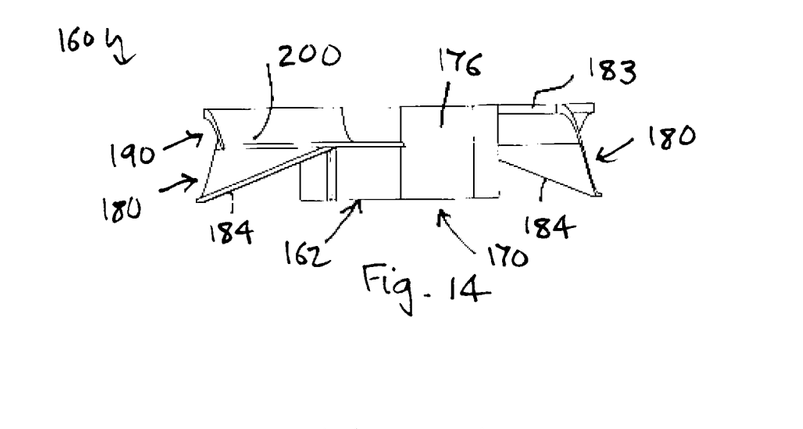
FIG. 14 is a left side elevation view of the rotor of FIG. 11.
Figure 15:
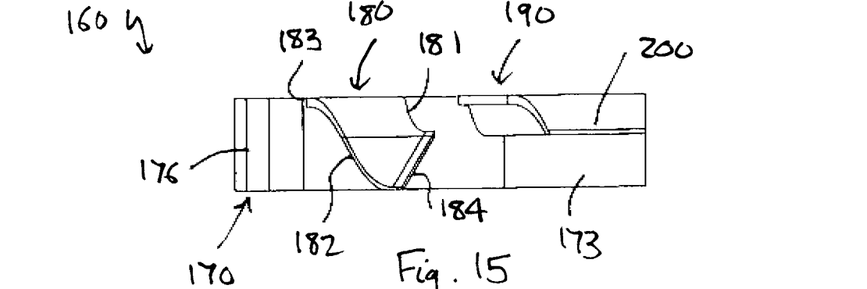
FIG. 15 is a front elevation view of the rotor of FIG. 11.
Figure 16:
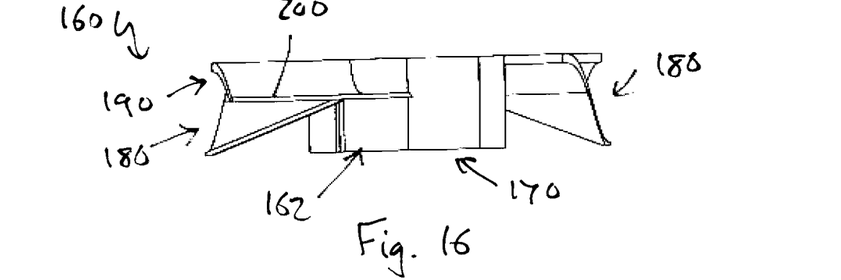
FIG. 16 is a right side elevation view of the rotor of FIG. 11.

Each second rotor blade 180 radially extends from a second blade root 181 at the rotor hub 162 to a second blade tip 182 at the radially outer end of the second rotor blade 180. In the depicted embodiment, each second rotor blade 180 comprises a thin complexly curved blade element extending from a second blade leading edge 183 to a second blade trailing edge 184. The second blade leading edge 183 extends radially and horizontally from the second blade root 181 to the second blade tip 182, level with the upper face of the rotor hub 162 and the upper face of the first rotor blade 170. The second blade trailing edge 184 extends radially and downwardly from the second blade root 181 to the second blade tip 182, such that the chordwise depth of the second rotor blade 180 increases toward the second blade tip 182. In the specific embodiment depicted, the second blade trailing edge 184 extends downwardly from a horizontal plane at an angle of approximately 26.2 degrees from the second blade root 181 to the second blade tip 182. As best shown in FIGS. 14 and 16, at the second blade root 181, the second blade trailing edge 184 is substantially horizontally aligned with the web 200. The leading portion of the second rotor blade 180 extending rearwardly from the second blade leading edge 183 has a convexly curved upper surface and concavely curved lower surface. The trailing portion of the second rotor blade 180 extending forward from the second blade trailing edge 184 has a concavely curved upper surface and convexly curved lower surface. At the second blade leading edge 183, the second rotor blade 180 extends substantially horizontally in the circumferential direction.

Each third rotor blade 190 radially extends from a third blade root 191 at the rotor hub 162 to a third blade tip 192 at the radially outer end of the third rotor blade 190. In the depicted embodiment, each third rotor blade 180 comprises a thin curved blade element extending from a third blade leading edge 193 to a second blade trailing edge 194. The third blade leading edge 193 extends radially and horizontally from the third blade root 191 to the third blade tip 192, level with the upper face of the rotor hub 162 and the upper face of the first rotor blade 170. The third blade trailing edge 194 extends radially and horizontally from the third blade root 191 to the third blade tip 192. The chordwise depth of the third rotor blade 190 is substantially constant. The third rotor blade 190 has a convexly curved upper surface and concavely curved lower surface. At the third blade leading edge 193, the third rotor blade 190 extends substantially horizontally in the circumferential direction.

Each web 200 extends horizontally from the arm leading face 173 of one of the first rotor blades 170 to the third blade trailing edge 194 of the adjacent third rotor blade 190. Each web 200 extends radially across the full radial length of the first and third rotor blades 170, 190.

Referring back to FIG. 3, each rotor 160 is mounted in proximity to the flow chamber outlet 142 by way of a threaded spindle 210 extending through the aperture 161 in the rotor hub 162, through the flow chamber outlet 142 into threaded engagement with the threaded aperture 154 on the inside of the upper wall 155 of the flow chamber 140. A washer 211 is mounted on each spindle 210 between the head of the spindle 210 and the rotor hub 162.

In operation, a liquid, typically waste water, to be treated flows into the manifold inlet 121 and is substantially equally divided between the four flow branches 129. Liquid passing through each of the manifold outlets 122 flows through the flow chamber inlet 141 of the corresponding flow chamber 140. The liquid flow is divided between the first and second flow branches 148, 149 and deflected to be delivered tangentially to the whirl chamber 158, where a vortical flow of liquid with a clockwise direction of rotation A (when viewed from above) is generated. Liquid exiting the whirl chamber 158 passes through the flow chamber outlet 142 in a conical vortex form of spray. The rotor 160 mounted to each flow chamber 140 is positioned such that the liquid flow exiting the flow chamber outlet 142 impacts the rotor blades 170, 180, 190 of the rotor 160 to rotationally drive the rotor 160, with the rotational driving of the rotor 160 in turn deflecting the liquid impacting the rotor blades 170, 180, 190 so as to disrupt the conical vortex flow and more evenly disperse liquid across the top of the membranes.

With the specific configuration of rotor 160 depicted, liquid impacting the arm trailing face 174 of each first rotor blade 170 is constrained from freely flowing radially along the arm 175 by the blade fence 176. This inhibits the radial flow and assists in ensuring the impact of the liquid on the first rotor blade 170 rotationally drives the rotor 160 in the clockwise direction. It is the first rotor blades 170 that provide the primary rotational driving force to rotate each rotor 160. Some driving force may also be provided by liquid impacting the trailing upper surface of each of the second and third rotor blades 180, 190.

The various geometries of the upper surfaces of the rotor blades 170, 180, 190 also deflect the liquid impacting the rotor blades 170, 180, 190 as the rotor 160 rotates so as to disperse the liquid flow. The second and third rotor blades 180, 190 provide the primary dispersal of liquid, with liquid impacting the curved leading lower surface of each of the second and third rotor blades 180, 190 deflecting the liquid downwardly and radially outwardly. Some liquid dispersal is also achieved by liquid impacting the first rotor blade 170. The varying geometry of the rotor blades, particularly of the second and third rotor blades 180, 190, deflects the liquid at varying angles, assisting in ensuring distribution of the liquid broadly across the top of the membranes located in the vicinity of each rotor blade 160. Liquid impacting the web 200 between the first and third rotor blades 170, 190 radially disperses liquid over an increased radius which will depend on the rate of flow of liquid.

The dispersal pattern may be adjusted by adjusting the separation between each rotor 160 and its associated flow chamber outlet 142 and by adjusting the length of the manifold outlets 122, effectively increasing the separation between the individual flow chambers 140. Connection pipes could also be fitted between each manifold outlet 122 and associated flow chamber inlet 141 to increase the separation between the individual flow chambers 140. The distance between the rotors 160 and the underlying membranes may also be adjusted to affect the breadth of dispersion. With the arrangement of flow paths and rotor blades, liquid flowing through the liquid flow distribution system 100 may be dispersed effectively without nozzles or other narrow constrictions which can be readily clogged by solid waste materials in suspension or biological surface growth. In the arrangement depicted, liquid flow rates of 6000 to 9000 litres per hour are readily achievable. The sizing of the various components of the flow distribution system 100 may be varies as appropriate to suit different flow rates.

A person skilled in the art will appreciate various other modifications or alternatives to individual features of the liquid flow distribution system described. A person skilled in the art will also appreciate that the liquid flow distribution system described may be used in any of various liquid flow distribution applications where nozzles and the like may otherwise be subject to clogging and/or biological growth, including for distribution of liquid fertilizers in agribusiness.

The invention claimed is:

1. A liquid flow distribution system comprising:

a flow chamber having a flow chamber inlet, a flow chamber outlet and a chamber flow path extending from said flow chamber inlet to said flow chamber outlet, said chamber flow path being curved so as to generate a generally vortical flow in liquid passing through said chamber flow path, said chamber flow path having an upstream flow path portion extending from the flow chamber inlet, and a downstream flow path portion extending from the upstream flow path portion to the flow chamber outlet, wherein the upstream flow path portion is divided into a first flow branch and a second flow branch by a curved flow division wall arranged in the flow path; and a rotor having a plurality of rotor blades, said rotor blades comprising at least two different configurations of rotor blade and being rotatably mounted about a rotor axis, said rotor being mounted in proximity to said flow chamber outlet and positioned such that a conical vortex flow of liquid exiting said flow chamber outlet impacts one or more of said rotor blades to rotationally drive said rotor, rotational driving of said rotor in turn dispersing liquid impacting said different configurations of rotor blade so as to disrupt the conical vortex flow and radially disperse liquid that exits the flow chamber outlet.

2. The system of claim 1 wherein said flow chamber further comprising a generally cylindrical whirl chamber defining said downstream flow path portion, said flow chamber outlet being defined at a base of said whirl chamber.

3. The system of claim 2 wherein said upstream flow path portion is configured to deliver liquid flow to said whirl chamber tangential to an outer wall of said whirl chamber.

4. The system of claim 1, wherein said second flow branch extends at least partially about said first flow branch.

5. The system of claim 1, wherein said second flow branch deflects liquid flowing through said second flow branch through at least 180 degrees.

6. The system of claim 2, wherein said first and second flow branches are configured to deliver liquid flow to opposing sides of said whirl chamber.

7. The system of claim 1 wherein said flow chamber outlet extends through a lower wall of said flow chamber.

8. The system of claim 1 wherein said flow chamber outlet has a larger cross-sectional area than a cross-sectional area of said flow chamber inlet.

9. The system of claim 1 wherein at least one of said rotor blades has a circumferentially extending blade fence at or adjacent a blade tip of said rotor blade, said blade fence extending in a trailing direction.

10. The system of claim 1 wherein said rotor further comprises at least one web extending between two adjacent rotor blades.

11. The system of claim 1 wherein said rotor is rotatably mounted about a spindle, said spindle extending through said flow chamber outlet and being mounted to said flow chamber.

12. The system of claim 1 wherein said liquid flow distribution system comprises:

a plurality of said flow chambers;

a plurality of said rotors, each said rotor being mounted in proximity to a corresponding said flow chamber; and a flow distribution manifold having a manifold inlet, a plurality of manifold outlets, and a branched manifold flow path extending from said manifold inlet to each of said manifold outlets, each said manifold outlet being in fluid communication with the flow chamber inlet of one of said flow chambers.

13. A water biotreatment unit comprising:

a housing;

a plurality of biotreatment membranes disposed in said housing; and the liquid flow distribution system of claim 1 mounted to said housing above said plurality of biotreatment membranes.

* * * * *